July 27, 1965
F. M. KELLY
3,197,055
PLASTIC CONTAINER, METALLIC CLOSURE PACKAGING
Filed July 9, 1963
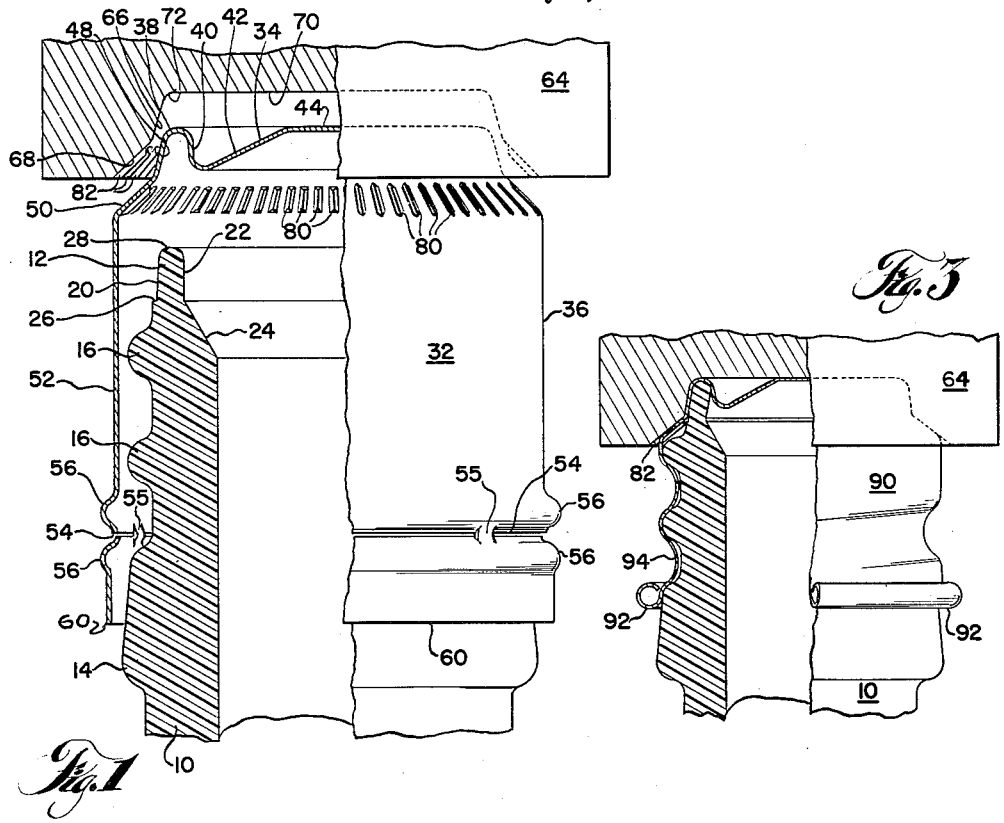
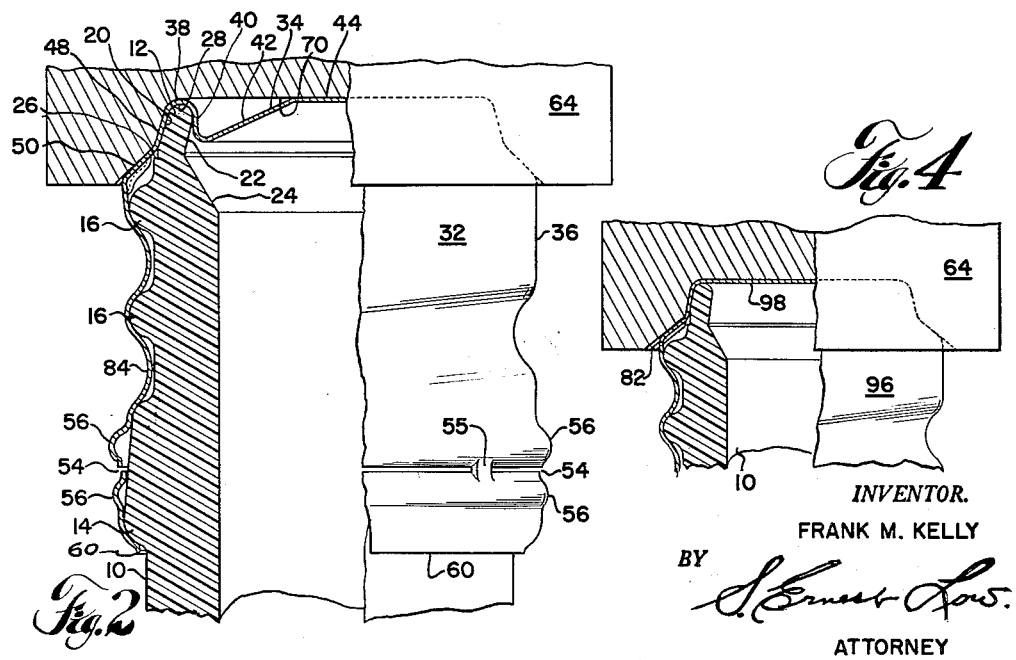
INVENTOR.
FRANK M. KELLY
BY
ATTORNEY United States Patent Office 3,197,055
Patented July 27, 1965

3,197,055
PLASTIC CONTAINER, METALLIC CLOSURE PACKAGING
Frank M. Kelly, Richmond, Ind., assignor to Aluminum Company of America, Pittsburgh, Pa., a corporation of Pennsylvania
Filed July 9, 1963, Ser. No. 293,637
8 Claims. (Cl. 215—43)

The invention hereinafter described and explained relates in general to packaging, and in more specific terms is addressed to the art of providing packages comprising containers or receptacles fabricated from conventional resilient and/or flexible self-supporting plastics equipped with substantially rigid metallic or similar closures therefor.

There has been considerable growth and expansion in the use and substitution of commercially available plastics in the container industry, with polyethylene resins accounting for as much as fifty to seventy percent of the plastic containers manufactured in the past two years. In addition to the polyethylene resins, thermosetting phenolic resins, acrylic resins, the styrenes, cellulosics such as nylon and similar synthetics, and formulated mixtures thereof, have also gained in their use in the plastic container and receptacle field, with considerable credit attaching to improved practices and developments in blow and injection molding now accounting for several hundred million pounds of plastic containers per annum.

By the term "plastics," as herein and hereinafter employed in this specification and appended claims, is meant commercially available resin formulations and mixtures thereof, with and without conventional additives, such as plasticizers, density-controlling agents, and strength-imparting additions, examples of the latter being risal, glass-wool fibers and similar fibrous materials, which plastic materials as a group are all capable of being molded or otherwise fabricated to provide self-sustaining containers or receptacles characterized by exhibiting inherent resiliency or flexibility, not associated with conventional glass containers under similar conditions of manufacture and use.

The herein contemplated resilient plastic containers, falling within the concept of the invention, have by their very nature provided the relatively shock-resistant throwaway and single type of package, with increased volume production and substitution of ever increasing plastic formulations resulting in lower initial product cost.

In addition to the inherent resiliency or flexibility exhibited by the self-supporting plastics contemplated within the scope of the invention, a further property or characteristic known as "memory" may also be associated and exhibited by many of the presently available plastics capable of responding to the invention. By "memory" is meant that property and ability of a self-supporting plastic to return to some original dimensional value following a deliberately exercised plastic dimensional change therein. Exemplary of this characteristic or property would be the return, or tendency to return, of the neck and adjacent entrance mouth-defining portions of a plastic container following deflection coupled with restrictive compressive plastic deformation thereof as a result of directional pressure application and temporary restraint by means of a substantially rigid closure, such as a metallic closure, applied in confining attachment on the neck of a plastic container to provide a usable package.

It would be extremely difficult, even if possible, to separate the two above-stated properties "resiliency" and "memory," when either one or both is or are exhibited by self-supporting plastic materials satisfying the present invention. Regardless of this fact, the terms "resiliency," "resilient" and/or "flexibility" have been employed interchangeably hereinafter and in the claims to include the property of "memory" and to define those properties of a self-sustaining plastic to respond to resilient deflection and transformation in the absence of permanent deformation. It is therefore to be understood that any one or more of the aforestated properties of the plastics herein contemplated has been utilized in support of new and improved composite packages, separate elements thereof, as well as closure-applying practices, incorporating preformed substantially rigid closures and closure shells in combination with resilient or plastic containers, with and without the need for a conventional sealing gasket or liner within the closure element of the packages falling within the teaching and scope of the present invention. Manifestly, the elimination of the conventional gasket or liner is one of the major advantages of the present invention.

A further and additional property exhibited by many of the available and conventional plastics herein contemplated is that property referred to as "lubricity" or "slipperiness." Although this property can be advantageous in respect to a reduction in the applied torque required to remove a closure from a plastic container exhibiting contacting surface lubricity, this latter property can also be the cause of a closure backing-off its threads, or other similar attaching means, to generate undesired leakers in packages so sealed. Such leaking tendencies can be further aggravated as a result of vibration of sealed plastic containers experienced in handling and transporting the same, in which case the lubricity of the plastic containers could aid in flexural disturbance and separation of adjacent contacting surfaces of a container finish and closure in the attachment and sealing areas therebetween.

It is therefore an object of the invention to provide a novel and unique combination of structurally preformed rigid closure and resilient plastic receptacle or container, with and without a liner or gasket, therebetween.

Another object of the invention is to provide a novel combination of substantially rigid closure and resilient plastic container or receptacle which obviates the necessity of a gasket or liner intermediate the sealing surfaces formed between adjacent contacting surfaces of the container and closure.

A further object of the invention is to provide structurally coordinated configuration between a resilient plastic container and its complementary rigid closure, in the sealing area therebetween, to insure substantially leak-proof sealing contact of an interior surface of the closure directly against an adjacent surface of the container.

An additional object of the invention is to provide preformed rigid closures and conventional plastic containers or receptacles provided with closure sealing and attaching configurations, which are capable in combination of providing substantially leak-proof packages.

Hereinafter related and described physical features, as well as methods and equipment pertaining to the practices of the invention, will be understood by those skilled in the art to be included objectives and advantages of the invention, illustrations selected for purposes of a full and knowledgeable description and understanding of the invention comprising:

FIG. 1, a fragmentary partial sectional elevational view of a substantially rigid preformed closure blank or shell, complementary resilient plastic container, and pressure block in exploded or axially separated disposition prior to closure-applying and affixing operations to produce a preferred container-closure combination of the invention;

FIG. 2, a fragmentary partial sectional elevational view of the stipulated elements specified in the description of FIG. 1 following a closure blank application and its conforming affixation to its underlying complementary container to provide a preferred integrated package of the invention;

FIG. 3, a fragmentary partial sectional elevational view of an integrated package providing a second embodiment of the invention; and FIG. 4, a fragmentary partial sectional elevational view of the upper sealed portion of an integrated package illustrating structural features capable of substitution in either embodiment of the invention illustrated in FIGS. 1 through 3.

It will be observed, on inspection and from reference to the aforesaid illustrations, that integrated packages and elements thereof falling within the scope of the invention, and the preferred methods of practicing the invention, basically comprise and require the provision of a container or receptacle 10 characterized as having been fabricated from any one of a wide variety of conventional resilient plastics, examples of which have been given in the forepart of this specification. The container 10 may be commercially fabricated by blow or injection molding, in which case it may, but not necessarily, include a faintly visual conventional vertical mold seam (not illustrated) over the entire depth or vertical height of the container, depending upon the molding equipment and technique employed in producing the same.

Except for the provision and incorporation of an upwardly extending annular lip or edge 12, defining the mouth or entrance to the plastic container 10, the container is conventional and similar in structure to glass containers in regard to its being provided with a thickened protective rolling band or outwardly extending shoulder 14 and inwardly set threads 16 above the same and below the lip 12. In this connection, interrupted threads, lugs, or other conventional closure-attaching instrumentalities may be substituted for the illustrated threads 16.

The upwardly extending lip 12 is a critical and significant structural feature of plastic containers satisfying and falling within the scope of the invention, and in integrated combination with preformed closure blanks or shells to be hereinafter described, has been discovered to establish the difference between success and failure of packages incorporating resilient plastic containers and substantially rigid metallic or similar closures therefor. In this regard it will be observed that the upwardly extending lip 12 is defined in transverse cross-section between outer and inner surfaces 20 and 22, respectively, which are substantially vertically disposed and parallel to the vertical longitudinal axis of the container 10, except where slight upward convergence of one or both surfaces 20 and 22 may be required to provide draft in the mold employed in forming the receptacle or container. In addition, the outer surface 20 of the annular lip 12 is preferably stepped radially inwardly from the exposed maximum outwardly projecting surface of the rolling band 14 and/or threads 16 at least a distance substantially coincident with a vertical plane defining the root diameter of the threads 16. Furthermore, the lip 12 preferably extends radially inwardly from its outer surface 20 to its inner surface 22 to define a transverse thickness therefor of approximately one-third, or within the range ¼ to ½, the maximum thickness of the container neck transversely through the rolling band or bead 14, thus requiring and accounting for an interior and preferably downwardly and inwardly inclined contiguous interior connecting surface 24 within the upper neck portion of the container 10. As an adjunct to molding equipment and conventional practices in the production and fabrication of plastic containers of the type herein contemplated, an inwardly projecting ledge is normally provided within the interior mold-defining surface producing the neck of the container to provide an accurate locating surface or shoulder 26. The shoulder 26 is usually the result of employing an upwardly withdrawable annulus or ring positioned within the mold to avoid the formation and visual presence of a vertical mold seam over the depth of lip 12 defined by the aforesaid ring or annulus in an otherwise conventional vertically split hingeably openable mold for producing bottles or containers. The upper terminal edge of the annular lip 12 is also preferably configured to provide an outwardly exposed substantially semicircular convex surface 28.

The preferred closure blank or shell 32 for integration through application and affixation over the previously described neck and immediately adjacent contiguous exterior portions of the plastic container 10 is generally cylindrically cup-shaped and preferably comprises a one-piece drawn metallic shell having a top end closing panel 34 and contiguous depending skirt 36, which are recognizable minimum requirements of a conventional closure blank or shell. The strip or sheet product from which the shells are drawn can if desired be predecorated on its outer exposed surface and coated on its inner surface with any one of many conventional product resisting lacquer coatings, or the like. Beyond these stated conventional minimum requirements of the closure blank or shell 32 are critical structural features essential to the performance and success of the invention, namely, the provision of a commercially acceptable integrated package comprising a resilient plastic container and rigid metallic or similar closure therefor, with and without the presence or need of a conventional gasket or liner within the closure element of the package.

Critical and essential in this respect is the preformed configuration of the depending skirt 36 and top panel 34 contiguously adjacent thereto. For example, the top panel 34, in the preferred embodiment of the invention illustrated in FIGS. 1 and 2, incorporates an inverted channel-shaped outer convexly exposed peripheral edge groove 38 the inwardly disposed and downwardly extending contiguous leg 40 of which is reversely and curvilinearly connected to an inwardly and upwardly inclined annular panel area or portion 42 in merged integral connection with a susbtantially flat central panel portion 44 to thus complete the closed end panel 34 of the closure blank 32.

An outwardly disposed leg 48 contiguous with the peripherally grooved at 38 closure blank 32 is inclined downwardly and outwardly at an angle of between 10° and 20°, preferably 15°, to the vertical or longitudinal axis of the closure shell 32, the inclined length of the leg 48 being preferably equal to or slightly less than the vertical depth of the flat outer surface 20 of the earlier described container lip 12. The skirt of the closure shell 32 contiguous with the inclined leg 48 preferably blends with and is downwardly and outwardly inclined at a greater angle to the vertical, say between 40° and 50°, and preferably 45°, to provide a second inclined contiguous wall area 50 in merged or blended relationship with a substantially right cylindrical depending lower skirt portion 52 of the closure shell 32.

Reference to FIGS. 1 and 2 will reveal that the skirt portion 52 of the closure shell or blank 32, in the preferred embodiment of the invention, is horizontally weakened by providing a circumferential line of horizontal slits 54 interrupted by at least two but preferably more than two unsevered bridges 55. The slits 54 are preferably located in an inwardly directed valley between axially spaced protruding beads 56 rolled or otherwise formed in the depending skirt portion 52 at a suitable distance above the open bottom terminal edge 60 of the closure blank 32.

It will be observed on further reference to FIGS. 1 and 2 that a pressure block 64 is preferably employed for applying and subsequent affixation of the preformed closure shell 32 over the neck and mouth portions of the previously described plastic container 10.

The pressure block 64 is a conventional element in many standard types of closure-applying mechanisms or apparatus, its significant structure and configuration as herein employed, however, including the provision of the dual interior contiguous truncated conical surfaces 66 and 68 conforming substantially in inclination, diametrical sizing and inclined lengths to the respective outwardly disposed inclined surfaces 48 and 50 of the preformed closure shell 32, as best appreciated in FIG. 2. The interior cavitation of the pressure block 64 is otherwise provided with a substantially flat bottom surface 70 in contiguous arcuate or curvilinear blending connection at 72 with the adjacent inclined interior surface 66 thereof. The interior curvilinear or concave surface 72 is also preferably selected to substantially conform to the exposed arcuate portion of the convex surface of the peripheral groove 38 of the preformed closure shell 32 nested in direct contact therewith.

A comparison of the illustrations of FIGS. 1 and 2 will reveal before and after relationship of the preformed rigid closure blank or shell 32 and resilient plastic container 10. From FIG. 2 it will be observed that the initially as fabricated substantially vertically disposed annular lip 12 of the container 10 has been resiliently deflected radially inwardly within the inverted channel-shaped groove 38 under the directionally applied and confining pressure exerted by the cavitied pressure block 64. In this connection, the previously described interior configurated cavity of the block 64 is complementary to and substantially coextensive with the double truncated conical exposed surfaces 50 and 48 and contiguous curvilinear outwardly and upwardly exposed peripheral curved edge surface of the groove or channel 38 connecting the uppermost inclined portion 48 of the depending skirt and top panel 34 of the preformed closure blank 32 so that the closure blank, in exposed double inclined side surface and upper exposed peripheral curved edge nested relationship within the pressure block 64, as well as the block itself, combine to act as a former or forming mold to inwardly and resiliently deflect, and in those instances where dimensionally provided, to compress the resilient plastic container lip 12 into upper regional inclined and contiguous curvilinear top and side peripherally sealing contact of the lip 12 within the inverted peripheral groove 38 of the closure blank 32. It will be appreciated that dimensional compression would occur where the groove or channel 38 is preformed slightly narrower in transverse cross-section than the lip 12 of the plastic container 10.

Because of the heretofore explained inherent resilient and/or memory properties or characteristics exhibited by the commercial plastic formulations herein contemplated for the containers 10, the container lip 12 (FIG. 2) reacts to resist its inward resilient deflection and any dimensional compression thereof from confinement within the inverted peripheral groove 38 of the closure shell or blank 32 to thereby exert an outward and upward side and top sealing contact against the interior contiguous contacting surfaces of the groove 38 of the substantially rigid preformed closure shell 32 adjacent thereto. While so sealed, and while still under the sealing pressure of the block 64, the lower depending substantially right cylindrical portion 52 of the depending skirt 36 of the substantially rigid closure blank 32 is permanently deformed, as by providing the complementary thread conformations 84, or similar conventional closure-attaching instrumentalities, in any one of several well-known manners to secure the closure thus provided in affixation on its underlying complementary container 10.

In the preferred embodiment of package of the invention (FIGS. 1 and 2), the lower terminal edge 60 of the closure blank 32 is turned or flanged inwardly on completion of the thread or equivalent closure affixing operation to provide a tamperproof integrated package. In this regard, axial locking of the closure on its underlying complementary container by the inwardly turned bottom edge 60 thereof insures maximum axial restraint against unauthorized as well as unintentional axial movement of the closure out of sealing relationship on the container so sealed, authorized separation of the closure in the plane of the circumferential line of slots 54 being otherwise accomplished by rotating the closure to axially remove the same.

Although the inherent resiliency characteristic of the plastic materials of the containers 10 has been referred to as a significant and advantageous property in the practice of the invention, it will be appreciated that the property known as "memory," which is also characteristic of many available commercial plastic formulations satisfying the invention, could function to provide additional resistance to inward deflection of the lip 12 and hence serve to increase and produce cumulative outward and upward sealing pressure of the exterior surfaces of the otherwise resilient lip 12 of the plastic container 10 against the upper and side regional interior adjacent contacting surfaces of the complementary preformed substantially rigid closure shell 32.

A second embodiment of the invention is illustrated in FIG. 3. Therein a preformed closure shell or blank 90, slightly modified in construction to that of FIGS. 1 and 2, is shown in removable sealed affixation on a plastic container identical to container 10 of the previously described preferred embodiment and package of the invention (FIGS. 1 and 2). In simplication of the package of FIG. 3, the closure shell 90 differs from the closure shell 32 (FIGS. 1 and 2) only in regard to its lower terminal edge outwardly curled bead 92, in place of the tamperproof band area and inturned locking flange 60 of the preferred embodiment of the invention. Otherwise, the plastic container 10, pressure block 64, and affixation of the shell 90 through formation of the threads 94, follow the identical practice described for the package of FIGS. 1 and 2.

The fragmentary upper portion of the integrated package of FIG. 4 represents a modification of the previously described packages of FIGS. 1, 2 and 3, differing therefrom only in the substitution of a closure shell 96, having an overall flat top panel 98, for the previously described and illustrated closures 32 and 90, respectively. In other respects, the container 10 and pressure block 64 are identical to those employed in producing the packages of FIGS. 1, 2 and 3.

It is of general significance that all embodiments of the illustrated and described integrated packages of the invention have employed identically configurated plastic container sealing surfaces in combination with the same upper regional double conical truncated preformed closure shells, thus permitting the use of a single interiorly configurated complementary pressure block. Any differences in the sealed and affixed closures of the hereinabove described integrated packages of the invention only obtains in the right cylindrical depending skirt regions of the closures and top panels thereof, without detracting from the provision of a package devoid, if desired, of a gasket or liner between its closure and underlying contacting sealing container finish.

Packages of the preferred form, illustrated in FIGS. 1 and 2, wherein the closure is axially restrained and gasketless, have been found to withstand internal pressures without leakage within the range 6 to 12 pounds per square inch, which is well within, and in many instances above, that required in commerce, whether the internal pressure was an initial requirement of a packaged commodity or is susceptible of being reached under storage conditions of commodities so packaged. The gasketless flat topped panel closures of FIG. 4, on the other hand, were found to be perfectly satisfactory and acceptable under atmospheric packaging conditions and up to three pounds per square inch internal pressure, above which some self-venting was observed. This self-venting characteristic is not uncommon in many commercial products, such as bleaching fluids, and hence does not detract from the efficiency and usefulness of the upper exposed flat-panelled packages (FIG. 4) of the invention, particularly since one of the normally required elements of a conventional container-closure integrated package, namely, a separate gasket or liner within the closure, can and has been eliminated by following the practices of the present invention.

Earlier mention that the lubricity characteristic exhibited by many of the resilient plastics contemplated for the containers of the invention can be advantageous in reducing the torque required to break the initial seal between the container and its complementary affixed closure, has in some instances made it necessary to knurl or otherwise pattern roughen the exterior sloping surface 50 of the closure blank 32, as well as the same surface of the closure shells of FIGS. 3 and 4, as by means of inwardly depressed decorative knurling 80, best illustrated in FIG. 1. When this knurling is required, it is customary to also complementarily knurl the interior sloping surface 68 of the pressure block 64 adjacent thereto, as by means of the outwardly directed complementary knurling 82, interlocking engagement of the knurled surfaces 80 and 82 insuring against rotation of the closure blanks 32, 90 and 96 relative to the container 10 in the event the attaching threads 84, or similar conventional attaching means, involve relative rotation between the depending skirts of the closure shells and a thread rolling device or devices of the type illustrated and described in United States Letters Patent 1,674,266, granted June 19, 1928. However, other conventional practices for conforming the depending skirts of closure shells of the invention to the attaching configurations on their underlying containers, such as by radial compression and deformation of the skirts in the absence of relative rotation, are employable and would dispense with the aforementioned knurling of the closure shell and adjacently engaging pressure block surfaces.

The integrated packages described above have all been described in terms of the closure blanks or shells 32, 90 and 96 having attaching means to their underlying containers 10 formed following application of the shells over the mouth and neck thereof. It will be understood that the shells 32, 90 and 96 can be initially provided with threads, or similar conventional attaching means, as an integral part of their depending skirts, in which case the closures so provided would be rotationally applied on their prethreaded plastic containers in any one of several conventional closure-applying mechanisms.

Having fully described selected embodiments of integrated resilient plastic container-preformed metallic closure combinations, individual elements and methods of producing the same, what is desired to be patentably covered is defined in the claims appended hereto.

I claim:

1. A substantially rigid closure shell for application on and combination with a container to provide a sealed package; said container having a mouth entrance defined by a flexibly resilient plastic upstanding circumferential substantially vertical lip of substantially thinner transverse thickness than the container neck immediately adjacent and contiguously below the lip, said lip being defined between outer and inner surfaces substantially parallel to the vertical longitudinal axis of the container; said closure shell being preformed to provide a downwardly and outwardly inclined depending circumferential skirt portion in contiguous curvilinear connection to a top panel thereof; said preformed substantially rigid closure shell being receivable over the upstanding flexibly resilient plastic lip of the container; and said closure shell under relative axial translation in respect of the container effecting inward resilient and confining angular deflection of the lip into substantial complementary outer surface conformity to the overlying interior inclined circumferential skirt portion and contiguous interior adjacent peripheral curvilinear connection thereof to the top panel of the closure shell.

2. A substantially rigid closure shell for application on and combination with a container to provide a sealed package; said container having a mouth entrance defined by a flexibly resilient plastic upstanding circumferential substantially vertical lip of substantially thinner transverse thickness than the container neck immediately adjacent and contiguously below the lip, said lip being defined between outer and inner surfaces substantially parallel to the vertical longitudinal axis of the container; said closure shell being preformed to provide a downwardly and outwardly inclined circumferential depending skirt portion from and in contiguous curvilinear connection to a top panel thereof, said inclined skirt portion providing a minimum dimensional circumference less than the outer circumference of the upstanding lip; said preformed substantially rigid closure shell being receivable over the upstanding flexibly resilient plastic lip of the container; and said closure shell under relative axial translation in respect of the container effecting inward resilient and confining angular deflection of the lip into substantial outer surface conformity to the overlying interior inclined circumferential skirt portion and contiguous interior adjacent curvilinear connection thereof to the top panel of the closure shell.

3. A substantially rigid closure shell for application on and combination with a container to provide a sealed package; said container having a mouth entrance defined by a flexibly resilient plastic upstanding circumferential substantially vertical lip of substantially thinner transverse thickness than the container neck immediately adjacent and contiguously below the lip, said lip being defined between outer and inner surfaces substantially parallel to the vertical longitudinal axis of the container; said closure shell being preformed to provide a downwardly and outwardly inclined circumferential depending skirt portion from and in contiguous curvilinear connection to a top panel thereof, said inclined skirt providing minimal interior dimensional circumference less than the outer circumference of the upstanding container lip; said preformed substantially rigid closure shell being receivable over the upstanding flexibly resilient plastic lip of the container; and said closure shell under relative axial translation in respect of the container effecting inward resilient and resiliently confining angular deflection of the lip into substantial outer surface conformity to and direct exterior abutting contact against the overlying interior inclined circumferential skirt surface and adjacent contiguous curvilinear connection of the preformed closure shell inclined skirt and adjacent contiguous top panel thereof.

4. A substantially rigid closure shell of substantially uniform gauge thickness for application on and combination with a container to provide a sealed package; said container having a mouth entrance defined by a flexibly resilient plastic upstanding circumferential substantially vertical lip of substantially uniform thinner transverse thickness than the container neck immediately adjacent and contiguously below the lip, said lip being defined by outer and inner surfaces substantially parallel to the vertical longitudinal axis of the container; said closure shell being preformed to provide a downwardly and outwardly inclined circumferential depending skirt portion in contiguous connection with a circumferential marginal interiorly upwardly open channel groove contiguous with a top panel of the closure shell; said preformed substantially rigid closure shell being receivable over the upstanding flexibly resilient plastic lip of the container; and said closure shell under relative axial translation in respect of the container effecting inward resilient and resiliently confining angular deflection of the lip into substantial outer and inner surface conformity to and interior surface contact within the interiorly upwardly open channel groove of the preformed closure shell in sealing relationship therebetween.

5. A substantially rigid closure shell of substantially uniform gauge thickness for application on and combination with a container to provide a sealed package; said container having a mouth entrance defined by a flexibly resilient plastic upstanding circumferential substantially vertical lip of substantially uniform thinner transverse thickness than the container neck immediately adjacent and contiguously below the lip, said lip being defined between outer and inner surfaces substantially parallel to the vertical longitudinal axis of the container; said preformed substantially rigid closure shell being characterized in transverse cross-section to provide a central flat top panel marginally downwardly depressed and contiguously upwardly directed to provide an inverted U-shaped peripheral channel groove upwardly terminating in the plane of the central top panel and downwardly and outwardly inclined into blended contiguous connection with a substantially right cylindrical subtending skirt portion of the closure shell; the preformed closure shell being receivable over the upstanding lip and neck of the container; said closure shell under relative axial translation effecting radial inward angular deflection and resilient confinement of the container lip within the peripheral channel groove thereof into surface contact therewithin; and said subtending substantially right cylindrical skirt portion of the closure shell being adapted to be affixed to the neck of the container therebelow.

6. A substantially rigid metallic closure shell for application on and combination with a resilient plastic container to provide a sealed tamperproof package; said plastic container being characterized by having a mouth entrance defined by an upstanding circumferential substantially vertical flexible lip of substantially thinner transverse thickness than the container neck immediately adjacent and contiguously below the lip, closure affixing configurations extending outwardly on the container neck below said lip, and an outwardly extending roll below said configurations forming a circumferential inwardly directed shoulder axially below said roll; said preformed metallic closure shell being characterized by having an upstanding inverted U-shaped channel upper preipheral rim contiguous with its top panel and extending downwardly and outwardly to provide an upper depending inclined skirt subtended by a substantially right cylindrical skirt portion, said subtending skirt being circumferentially weakened above its lower terminus; said closure shell being receivable over the upstanding circumferential lip and responding under relative axial translation in respect of the container to effect radial inward deflection and entry of the lip into the inverted U-shaped channel of the closure shell to provide substantial contacting conformity of the lip with the interior surfaces of the inverted channel of the closure shell; and said substantially right cylindrical depending skirt of the closure shell being adapted to be conformed to the affixing configurations on the container neck above the outwardly extending roll and inwardly directed under the shoulder therebelow to provide tamperproof securement of the package so formed.

7. A substantially rigid closure shell of substantially uniform gauge thickness for application and combination with a container to provide a gasketless sealed package; said container having a mouth entrance defined by a flexibly resilient deformable plastic upstanding lip of substantially thinner transverse thickness than the container neck immediately and contiguously therebelow, said lip being substantially vertically disposed and defined between outer and inner surfaces substantially parallel to the longitudinal axis of the container; said closure shell being preformed to provide a downwardly and outwardly inclined circumferential depending skirt portion from and in contiguous curvilinear connection to a top panel thereof, said inclined skirt providing interior minimal dimensional circumference less than the outer circumference of the upstanding container lip; said preformed substantially rigid closure shell being receivable over the upstanding flexibly resilient deformable plastic lip of the container; and said closure shell under relative axial translation in respect of the container effecting circumferentially inward resilient and resiliently confining angular deflection of the container lip into direct gasketless abutting outer surface sealing contact against a coextensive circumferential interior inclined surface and contiguous curvilinear connecting area of the preformed closure shell overlying and in confining side and top sealing restraining pressure thereagainst.

8. A substantially rigid closure shell of substantially uniform gauge thickness metal for application on and combination with a container to provide a sealed package; said container having a mouth entrance defined by a flexibly resilient plastic upstanding circumferential substantially vertical lip of substantially thinner transverse thickness than the container neck immediately adjacent and contiguously below the lip, said lip being defined between outer and inner surfaces substantially parallel to the vertical longitudinal axis of the container; said closure shell being preformed to provide a downwardly and outwardly inclined depending circumferential skirt portion in contiguous curvilinear connection to a top panel thereof; the inclination of said skirt being between 10° and 20° to the vertical axis of the closure shell; said preformed substantially rigid closure shell being receivable over the upstanding flexibly resilient plastic lip of the container; and said closure shell under relative axial translation in respect of the container effecting inward resilient and confining angular deflection of the lip into substantial outer surface conformity to the overlying inclined interior surface skirt portion and contiguous adjacent curvilinear connection thereof to the top panel of the closure shell.

References Cited by the Examiner
UNITED STATES PATENTS

| | | | |
|---|---|---|---|
| 2,298,777 | 10/42 | Thomas | 215—43 |
| 3,001,657 | 9/61 | Gamble | 215—42 |
| 3,089,603 | 5/63 | Smith | 215—43 |

FOREIGN PATENTS 209,870    8/57    Australia.

THERON E. CONDON, *Primary Examiner.*

EARLE J. DRUMMOND, *Examiner.*

UNITED STATES PATENT OFFICE

CERTIFICATE OF CORRECTION

Patent No. 3,197,055                                                     July 27, 1965

Frank M. Kelly

It is hereby certified that error appears in the above numbered patent requiring correction and that the said Letters Patent should read as corrected below.

Column 1, line 46, before "type" insert -- use --.

Signed and sealed this 18th day of January 1966.

(SEAL)
Attest:

ERNEST W. SWIDER                                    EDWARD J. BRENNER
Attesting Officer                                        Commissioner of Patents